US006364301B1

(12) United States Patent
Takahashi

(10) Patent No.: US 6,364,301 B1
(45) **Date of Patent: *Apr. 2, 2002**

(54) CLAMP APPARATUS

(75) Inventor: Kazuyoshi Takahashi, Tokyo (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/689,849

(22) Filed: Oct. 13, 2000

(30) Foreign Application Priority Data

Oct. 15, 1999 (JP) .......................................... 11-293613

(51) Int. Cl.[7] ................................................ B23Q 3/08
(52) U.S. Cl. ............................ 269/32; 269/27; 269/228
(58) Field of Search ............................ 269/32, 228, 25, 269/27, 31, 33, 201, 24, 233

(56) References Cited

U.S. PATENT DOCUMENTS 4,723,767 A 2/1988 McPherson et al. .......... 269/32
5,575,462 A * 11/1996 Sawdon ....................... 269/32
5,634,629 A * 6/1997 Blatt ........................... 269/32
5,884,903 A * 3/1999 Sawdon ....................... 269/32
5,996,984 A * 12/1999 Takahashi .................... 269/32
6,065,743 A * 5/2000 Roudier et al. ............... 269/32
5,875,417 A * 6/2000 Golden ........................ 269/32
6,076,816 A * 6/2000 Tunkers ....................... 269/32

* cited by examiner

*Primary Examiner*—Derris H. Banks
*Assistant Examiner*—Lee Wilson
(74) *Attorney, Agent, or Firm*—Paul A. Guss

(57) ABSTRACT

A clamp apparatus comprising a holding member which is formed of a metal material and which is displaceable in an axial direction of a body in accordance with rotary action of an arm, and a pair of proximity switches for sensing the position of the holding member respectively. The holding member is selected from a plurality of available holding members having respective different lengths and selectively provided corresponding to a rotation amount of the arm.

8 Claims, 14 Drawing Sheets

CLAMP APPARATUS

BACKGROUND OF THE INVENTION

1. Field of the Invention

The present invention relates to a clamp apparatus capable of clamping a workpiece by using an arm which is rotatable by a predetermined angle in accordance with a driving action of a driving source.

2. Description of the Related Art

The clamp apparatus has been hitherto used, for example, in order to clamp a constitutive part when the constitutive part of an automobile or the like is welded. Such a clamp apparatus is disclosed, for example, in U.S. Pat. No. 4,723, 767.

In the clamp apparatus disclosed in U.S. Pat. No. 4,723, 767 (not shown), a ball screw shaft is linearly displaced in accordance with the driving action of a motor. The rectilinear motion of the ball screw shaft is converted into the rotary motion of an arm by the aid of a link mechanism.

A switch rod, which is displaceable integrally with the ball screw shaft, is coaxially connected to one end of the ball screw shaft. The position of rotation of the arm is detected by sensing the switch rod by using a pair of switch elements which are separated from each other by a predetermined spacing distance.

However, the clamp apparatus concerning the conventional technique described above involves the following inconvenience. That is, the position, at which the arm is subjected to the clamping, differs, for example, depending on the thickness of the workpiece. Therefore, when the angle of rotation of the arm is changed, the distance of the linear displacement of the switch rod differs. It is impossible to sense the switch rod by using the pair of switch elements.

In other words, the following inconvenience arises. That is, each of the pair of switch elements senses the switch rod when the switch rod makes approach. Therefore, when the amount of rotation of the arm is changed, the switch rod does not make approach up to be within an allowable range in which the switch rod is sensed by the switch element.

SUMMARY OF THE INVENTION

A general object of the present invention is to provide a clamp apparatus which makes it possible to reliably detect the position of rotation of an arm even when the amount of rotation of the arm is changed.

A principal object of the present invention is to provide a clamp apparatus which makes it possible to reliably detect a first terminal end position of displacement to give an unclamping state and a second terminal end position of displacement to give a clamping state for an arm, by selecting an arbitrary detection object from a plurality of detection objects having different lengths respectively, corresponding to an amount of rotation of the arm.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A clamp apparatus 10 according to an embodiment of the present invention comprises a body 12 which is formed to have a flat configuration in an integrated manner, a cylinder section (driving source) 14 which is coupled in an air-tight manner to the lower end of the body 12, and an arm 20 which is coupled to a rectangular bearing section 18 protruding to the outside through a pair of substantially circular openings 16*a*, 16*b* (see FIG. 4) formed through the body 12.

Figure 5:
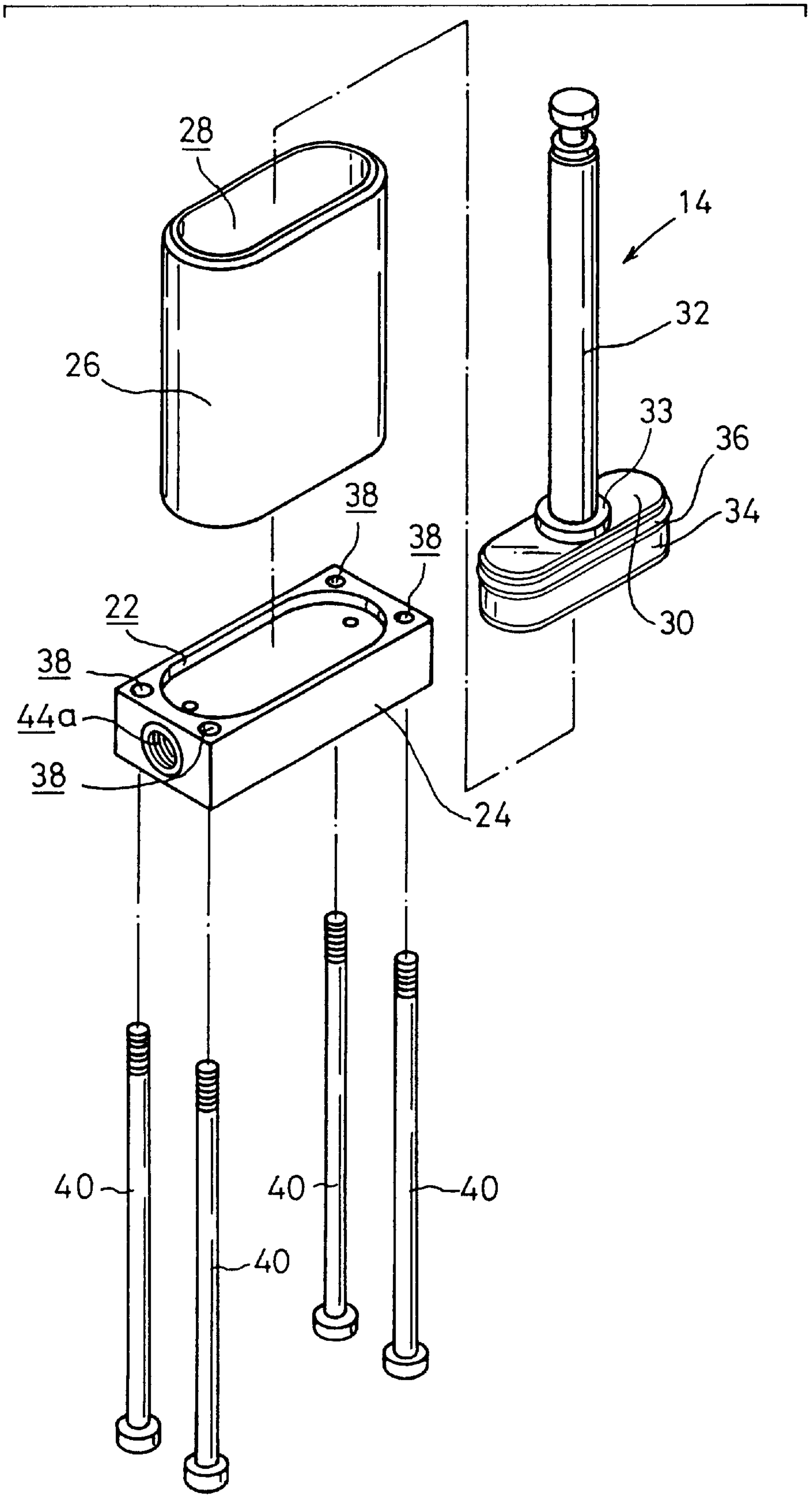
FIG. 5 shows an exploded perspective view illustrating a cylinder section for constructing the clamp apparatus.

As shown in FIG. 5, the cylinder section 14 includes an end block 24 which has an elliptic recess 22 formed on its upper surface, and a cylinder tube 26 which is composed of a cylinder having an elliptic cross section with its first end coupled in an air-tight manner to the recess 22 of the end block 24 and with its second end coupled in an air-tight manner to the bottom surface of the body 12.

Figure 3:
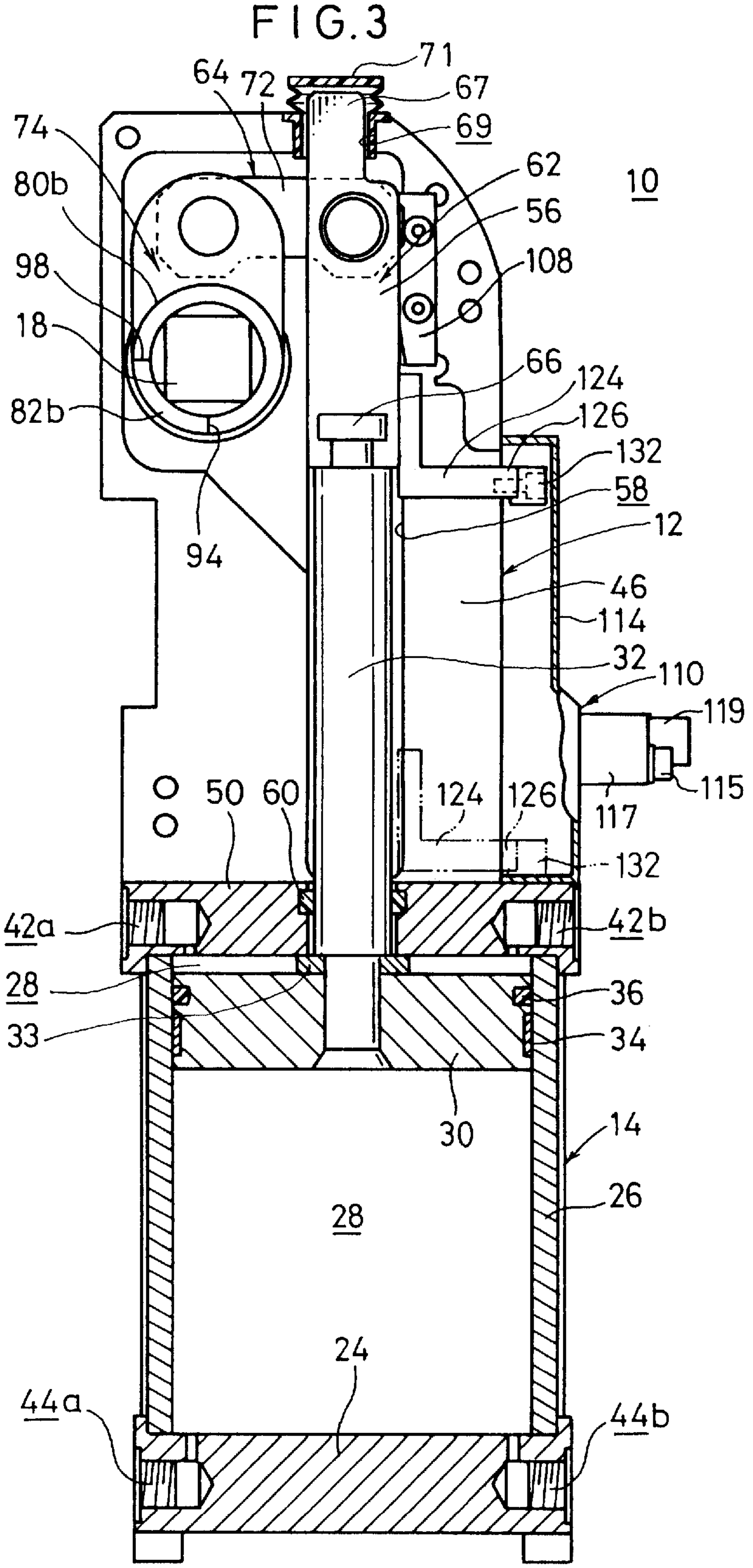
FIG. 3 shows a longitudinal constitutive sectional view taken along a line III—III shown in FIG. 1.

As shown in FIGS. 3 and 5, the cylinder section 14 further comprises a piston 30 which is accommodated in the cylinder tube 26 and which makes reciprocating movement along a cylinder chamber 28, a piston rod 32 which is coupled to a central portion of the piston 30 and which is displaceable integrally with the piston 30, and a ring-shaped spacer 33 which is provided at the connecting portion between the piston 30 and the piston rod 32 and which is externally fitted to the piston rod 32 via a hole. The spacer 33 is made of a metal material such as aluminum. The spacer 33 abuts against the wall surface of a projection 50 for forming the upper portion of the cylinder chamber 28 at the terminal end position of displacement of the piston 30, and thus it functions as a stopper for regulating the displacement of the piston 30. Alternatively, the piston 30 and the spacer 33 may be formed to be integrated into one unit.

As shown in FIGS. 3 and 5, a wear ring 34 and a seal ring 36 are installed to the outer circumferential surface of the piston 30 respectively. Attachment holes 38 are bored through four corner portions of the end block 24. The end block 24 and the cylinder tube 26 are assembled in an air-tight manner to the body 12 by the aid of four shafts 40 inserted through the attachment holes 38. Pairs of pressure fluid inlet/outlet ports 42*a,* 42*b,* 44*a,* 44*b,* which are used to introduce and discharge the pressure fluid (for example, compressed air) with respect to the cylinder chamber 28 respectively, are formed mutually opposingly in the body 12 and the end block 24 respectively (see FIG. 3).

When the clamp apparatus 10 is practically used, unillustrated blank caps are screwed into any pair of the pressure fluid inlet/outlet ports 42*a,* 44*a* (or 42*b,* 44*b*). Thus, the clamp apparatus 10 is used in a state in which one of the pairs of pressure fluid inlet/outlet ports 42*a,* 44*a* (or 42*b,* 44*b*) are closed.

Figure 4:
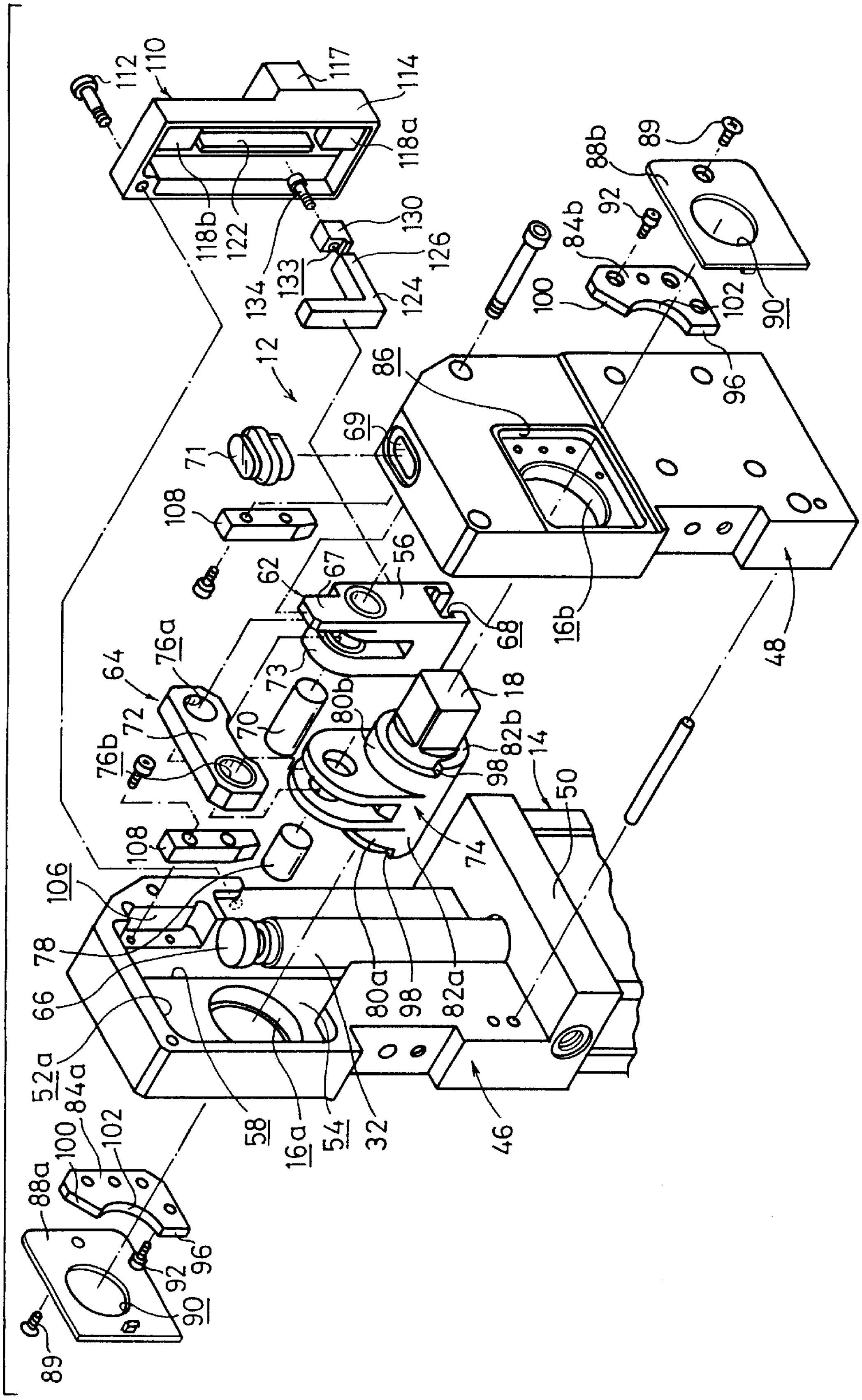
FIG. 4 shows an exploded perspective view illustrating the body for constructing the clamp apparatus.

As shown in FIG. 4, the body 12 comprises a first casing 46 and a second casing 48 which are asymmetric and which are assembled in an integrated manner. A projection 50, which protrudes in a substantially horizontal direction and which functions as a rod cover, is formed in an integrated manner at the lower end of the first casing 46. The second casing 48 is formed to have a size in the longitudinal direction which is shortened by a thickness of the projection 50 as compared with the first casing 46. In this arrangement, as shown in FIG. 4, the second casing 48 can be detached from the first casing 46 without disassembling the cylinder section 14. Thus, the body 12 can be disassembled conveniently and easily.

As shown in FIG. 4, a chamber 54 is formed in the body 12 by recesses 52*a,* 52*b* formed for the first casing 46 and the second casing 48 respectively (the recess 52*b* is omitted from the illustration because it has the same structure as that of the recess 52*a*). The free end of the piston rod 32 is provided to face in the chamber 54. In this arrangement, the piston rod 32 is guided linearly reciprocatively by the aid of guide grooves 58 which are formed on the inner wall surfaces of the first casing 46 and the second casing 48 respectively and on which a knuckle block 56 is slidable as described later on. A rod packing 60 (see FIG. 3) for surrounding the outer circumferential surface of the piston rod 32 is provided at a through-hole formed in the projection 50.

As shown in FIG. 4, a toggle link mechanism 64, which is used to convert the rectilinear motion of the piston rod 32 into the rotary motion of the arm 20 by the aid of a knuckle joint (driving force-transmitting mechanism) 62, is provided at a first end of the piston rod 32. The knuckle joint 62 comprises a knuckle block 56 having a forked section with branches separated by a predetermined spacing distance and branched substantially in parallel to one another, and a knuckle pin 70 for being rotatably attached to a hole formed in the forked section.

A releasing projection 67, which protrudes upwardly, is integrally formed on one of the branches of the forked section of the knuckle block 56 (see FIG. 4). The releasing projection 67 is provided so that it protrudes by a predetermined length from an opening 69 having a substantially elliptic configuration formed at an upper surface portion of the second casing 48 when a workpiece is clamped by the arm 20 (see FIG. 3). A cap 71, which is made of, for example, synthetic resin or rubber and which is expandable and contractible, is installed to the opening 69 (see FIG. 7). The cap 71 is provided so that it covers the releasing projection 67 which protrudes from the opening 69, and it closes the opening 69.

In this arrangement, the clamping state can be canceled to make restoration into the unclamping state by an operator, for example, by means of manual operation by pressing the expandable and contractible cap 71 to displace the releasing projection 67 downwardly.

Figure 14:
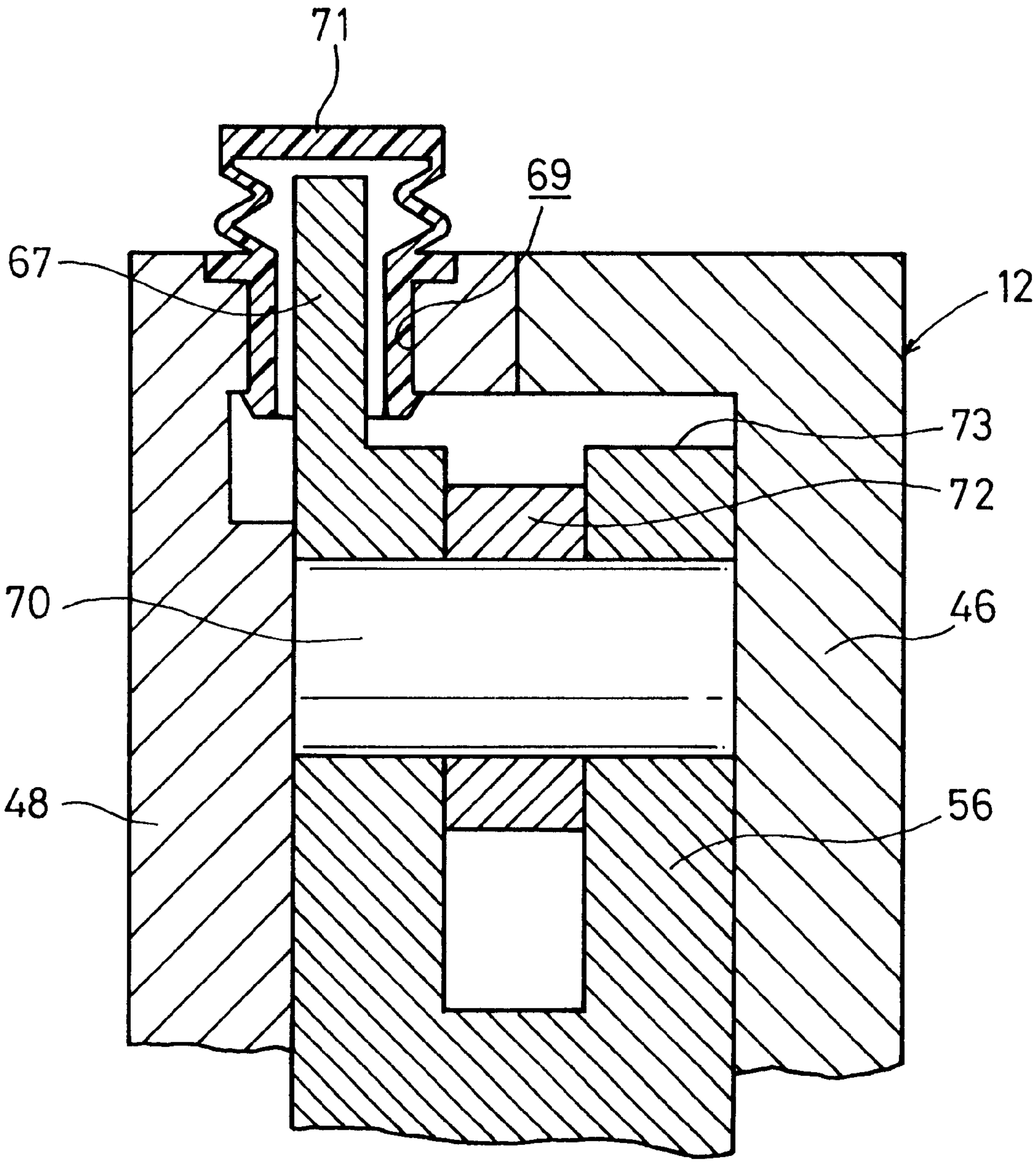
FIG. 14 shows a vertical sectional view illustrating the position of a knuckle joint when the clamping state is given.

As shown in FIG. 14, when the workpiece is clamped, the other upper surface portion 73 of the forked section of the knuckle block 56, on which the releasing projection 67 is not formed, does not abut against the inner wall surface of the body 12. A predetermined clearance is provided between the upper surface portion 73 and the inner wall surface of the body 12.

As shown in FIG. 4, a groove 68 having a T-shaped cross section, with which a disk-shaped projection 66 of the piston rod 32 is engaged, is formed at a bottom surface portion of the knuckle block 56 to extend in a substantially horizontal direction. In this arrangement, predetermined clearances are formed between the groove 68 and the projection 66 formed integrally with the piston rod 32 and between the knuckle block 56 and the guide groove 58. The knuckle block 56 is provided slidably substantially horizontally along the groove 68. Thus, the piston rod 32 is prevented from transmission of any load in the lateral direction. In other words, by providing the degree of freedom for the knuckle block 56, for example, when a workpiece is clamped, then no lateral load is applied, for example, to the piston rod 32 and the rod packing 60, and the stroke of the piston rod 32 can be efficiently transmitted to the toggle link mechanism 64.

As shown in FIG. 4, the toggle link mechanism 64 includes a link plate 72 which is coupled to the forked section of the knuckle joint 62 by the aid of a knuckle pin 70, and a support lever 74 which is rotatably supported by the pair of substantially circular openings 16*a,* 16*b* formed through the first casing 46 and the second casing 48 respectively.

The link plate 72 is allowed to intervene between the knuckle joint 62 and the support lever 74, and it functions to link the knuckle joint 62 and the support lever 74. Specifically, the link plate 72 is formed with a pair of holes 76*a,* 76*b* which are separated from each other by a predetermined spacing distance. The link plate 72 is coupled to the free end of the piston rod 32 via the knuckle joint 62 and the knuckle pin 70 rotatably attached to the first hole 76*a*. The link plate 72 is coupled to the forked section of the support lever 74 via a first pin member 78 rotatably attached to the second hole 76*b*.

As shown in FIG. 4, the support lever 74 includes a forked section which is formed with holes for rotatably attaching the first pin member 78, the bearing section 18 which is formed to protrude in a direction substantially perpendicular to the axis of the piston rod 32 and which has a rectangular cross section exposed to the outside from the body 12 through the opening 16*b,* a pair of circumferential sections 80*a,* 80*b* which are formed adjacently with the forked section interposed therebetween and which are fitted to the substantially circular openings 16*a,* 16*b* of the body 12 respectively, and a pair of circular arc-shaped projections 82*a,* 82*b* which are formed to slightly protrude in the lateral direction from the circumferential sections 80*a,* 80*b* and which are exposed to the outside from the body 12 through the openings 16*a,* 16*b* respectively. The arm 20 for claiming the unillustrated workpiece is detachably installed to the bearing section 18.

The support lever 74 is provided to make the rotary action integrally with the arm 20. The circular arc-shaped projections 82*a,* 82*b,* which are formed on the support lever 74, abut against plates 84*a,* 84*b* fixed to the body 12 (as described later on). Accordingly, the circular arc-shaped projections 82*a,* 82*b* function as the stopper for stopping the rotary action of the arm 20.

The rectilinear motion of the piston rod 32 is transmitted to the support lever 74 via the knuckle joint 62 and the link plate 72. The support lever 74 is provided rotatably by a predetermined angle about the center of rotation of the circumferential sections 80*a,* 80*b* which are supported by the pair of openings 16*a,* 16*b* formed through the body 12.

As shown in FIG. 4, oblong recesses 86 are formed on the side surfaces of the first casing 46 and the second casing 48 for constructing the body 12 respectively. The recesses 86 are closed by a pair of cover members 88*a,* 88*b*. The cover members 88*a,* 88*b* are installed detachably by the aid of screw members 89. In this arrangement, the bearing section 18 of the support lever 74 is provided to be exposed to the outside through a substantially circular opening 90 which is formed at a substantially central portion of the cover member 88*b*.

The plates 84*a,* 84*b,* which make abutment against the circular arc-shaped projections 82*a,* 82*b* of the support lever 74 to stop the rotary action of the arm 20, are fixed on the wall surfaces of the recesses 86 by the aid of screw members 92.

Figure 6:
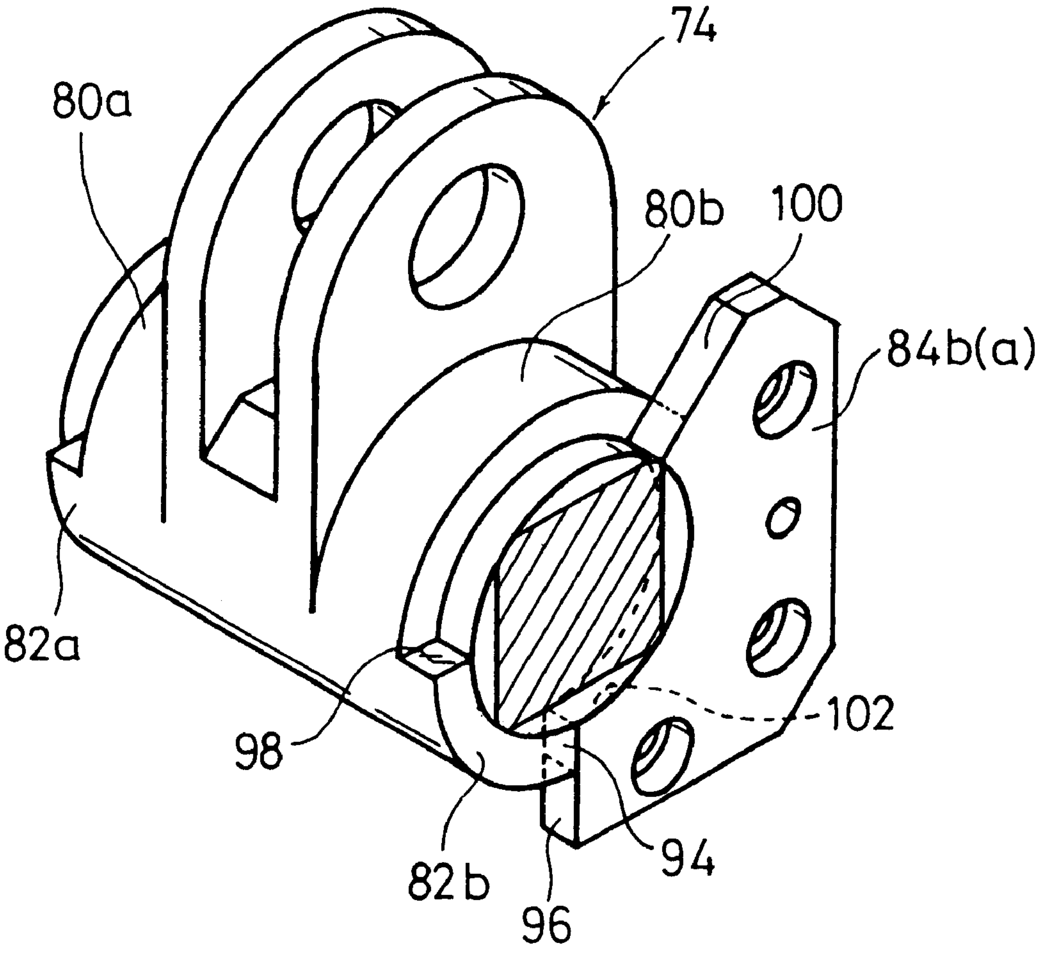
FIG. 6 shows, with partial cutout, a perspective view illustrating a state in which a circular arc-shaped projection of a support lever abuts against a plate.

As shown in FIG. 6, the plate 84*b* (84*a*) has a first abutment surface 96 for making abutment against a first end surface 94 of the circular arc-shaped projection 82*b* (82*a*), and a second abutment surface 100 for making abutment against a second end surface 98 of the circular arc-shaped projection 82*b* (82*a*). A curved surface 102 for surrounding the support lever 74 is formed between the first abutment surface 96 and the second abutment surface 100. The first end surface 94 and the second end surface 98 of the support lever 74 are formed so that they are separated from each other by an angle of about 90 degrees. It is a matter of course that the angle of separation between the first end surface 94 and the second end surface 98 of the support lever 74 is not limited to 90 degrees.

Figure 1:
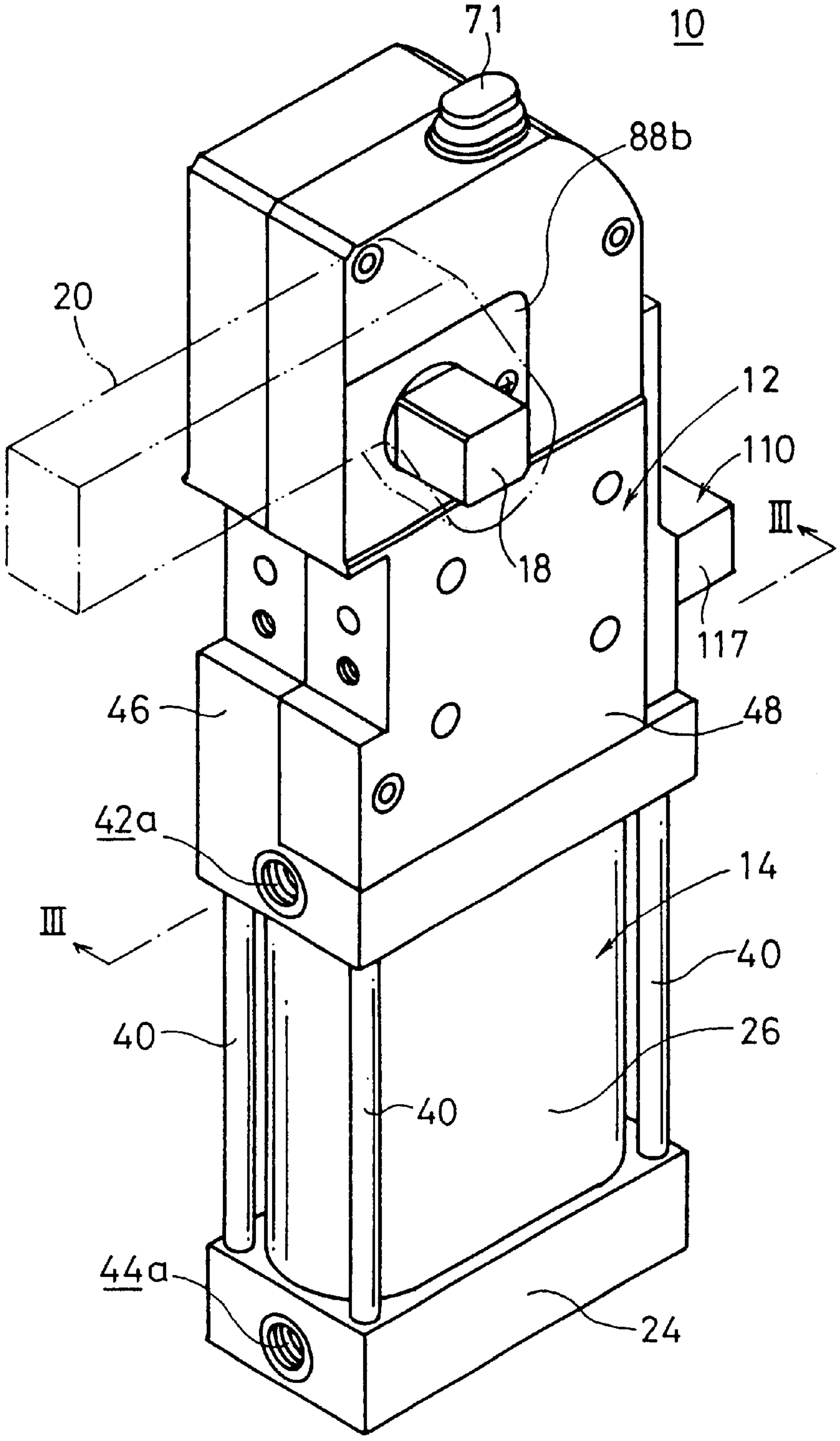
FIG. 1 shows a perspective view illustrating a clamp apparatus according to an embodiment of the present invention.
Figure 2:
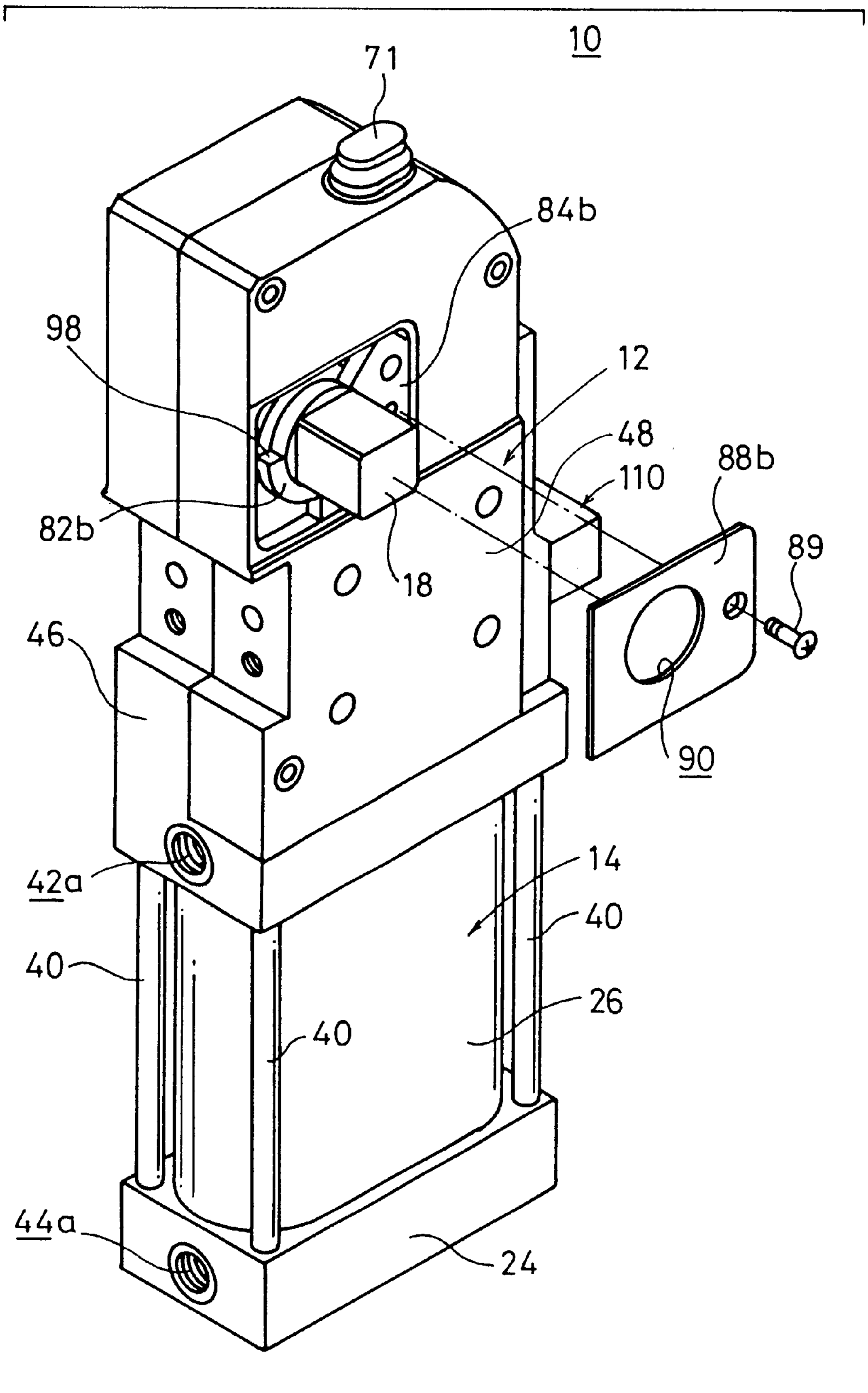
FIG. 2 shows a perspective view illustrating a state in which a cover member is detached from a body of the clamp apparatus.

In this arrangement, the pair of plates 84*a,* 84*b* can be conveniently exchanged with other plates (as described later on) with ease by detaching the pair of cover members 88*a,* 88*b* from the body 12 respectively, and loosening the screw members 92. When the pair of cover members 88*a,* 88*b* are detached from the body 12 respectively, the first end surface 94 and the second end surface 98 of the circular arc-shaped projection 82*b* (82*a*) formed-on the support lever 74 are exposed to the outside as shown in FIG. 2 (however, the first end surface 94 is not shown).

Recesses 106 each having a rectangular cross section are formed on upper side portions of the inner wall surfaces of the first casing 46 and the second casing 48 for constructing the body 12 respectively. A pair of reaction force-receiving plates 108, which are used to receive the reaction force by making abutment against the knuckle joint 62 when the clamping state is given, are fixed to the recesses 106 by the aid of screw members. The pair of guide grooves 58, which are composed of rectangular grooves and which extend in the vertical direction, are provided mutually opposingly on the inner wall surfaces of the first casing 46 and the second casing 48. The knuckle block 56 is interposed between the pair of guide grooves 58. The knuckle block 56 is provided slidably in the vertical direction in accordance with the guiding action of the guide grooves 58.

Figure 7:
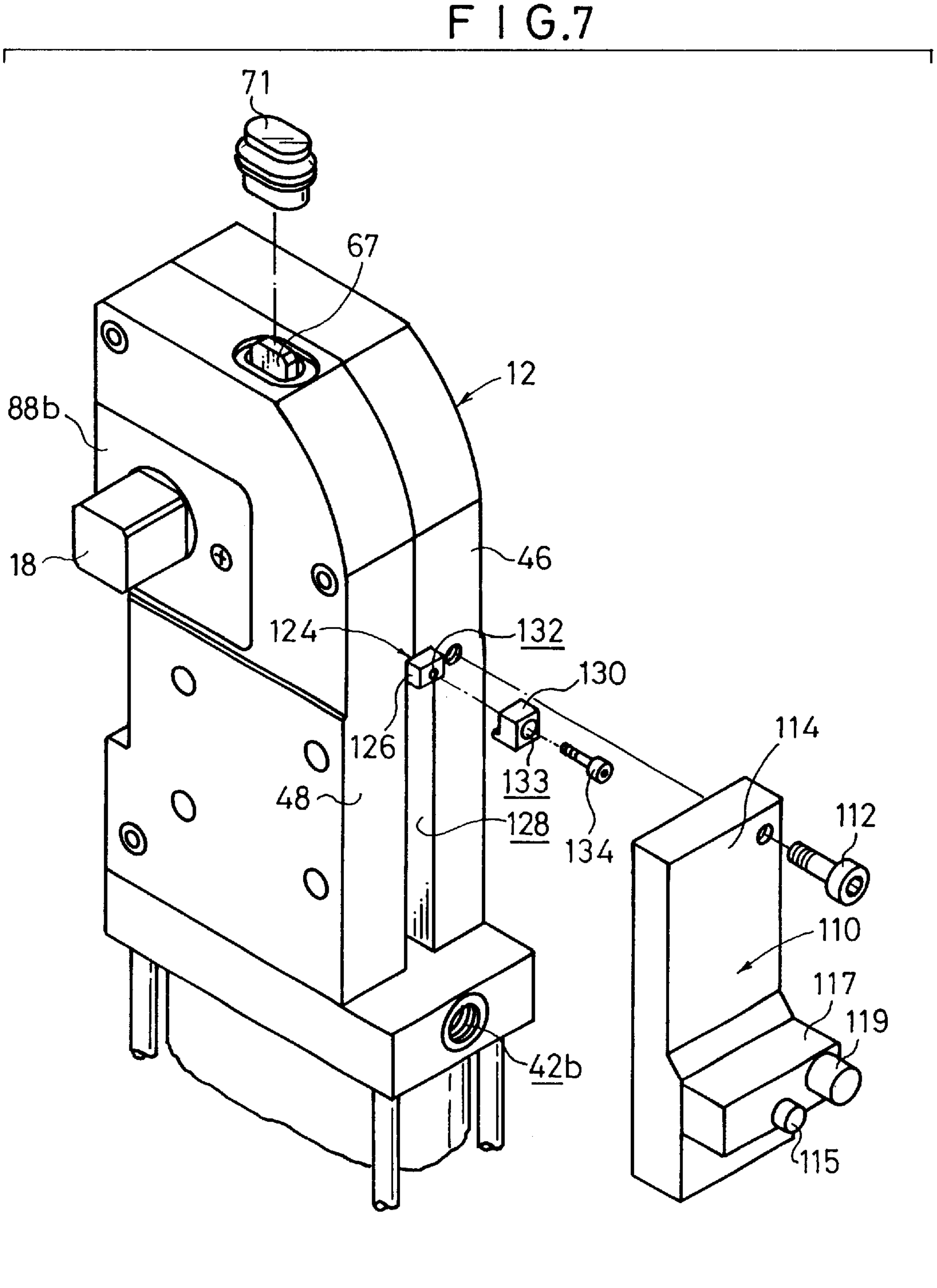
FIG. 7 shows an exploded perspective view illustrating a detecting section which constructs the clamp apparatus.

As shown in FIGS. 4 and 7, a detecting section (detecting mechanism) 110, which is used to detect the amount of rotation of the arm 20 that is rotatable by the predetermined angle, is detachably connected to the outer wall surface of the body 12 by the aid of a screw member 112. The detecting section 110 includes a switch holder 114 which is installed to a side surface portion of the body 12, and a rectangular parallelepiped-shaped connector section 117 which is connected to the switch holder 114 in an integrated manner. The connector section 117 is provided with a connecting connector 119 which is disposed closely to an attachment bolt 115.

Figure 8:
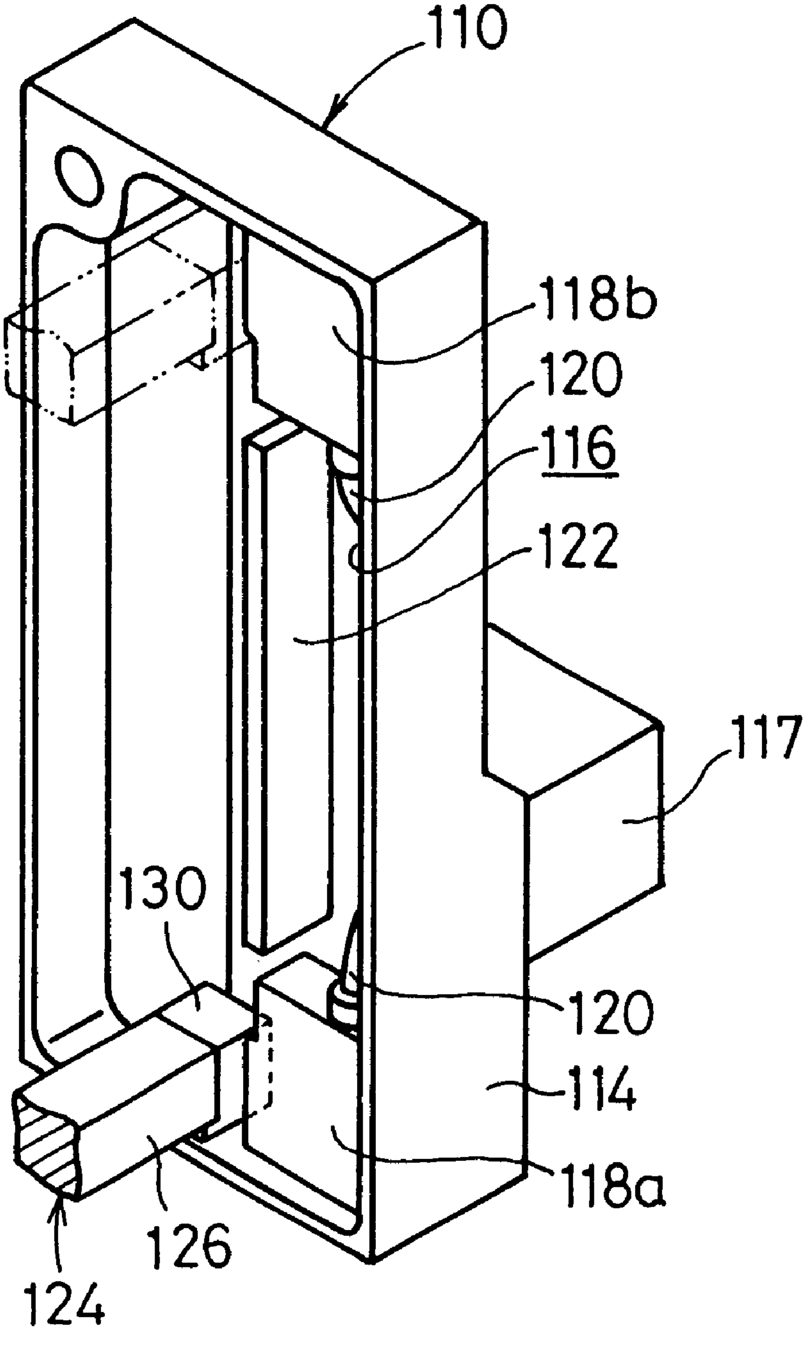
FIG. 8 shows a perspective view as viewed from the bottom surface side, illustrating a switch holder which constructs the detecting section.

As shown in FIG. 8, a pair of proximity switches (first sensor and second sensor) 118*a,* 118*b,* which are used to sense the position of a metal detection object by utilizing the change of impedance in accordance with the approaching action of the metal detection object, are secured to a recess 116 formed on the inner wall surface of the switch holder 114 in a state of being separated from each other by a predetermined spacing distance. The proximity switches 118*a,* 118*b* are connected to the connector section 117 via lead wires 120. Therefore, the detection signal, which is outputted from the proximity switch 118*a,* 118*b,* is introduced into an unillustrated external equipment (for example, controller or the like) connected to the connecting connector 119 via an unillustrated coaxial cable or the like to perform desired control. A plate-shaped partition wall 122 for accommodating the lead wire 120 is formed between the pair of proximity switches 118*a,* 118*b*.

As shown in FIGS. 4 and 7, the detecting section 110 includes a bent member 124 which is made of a metal material and which is formed to have a substantially L-shaped configuration. The bent member 124 is fixed to the knuckle block 56, and it is displaceable integrally with the knuckle block 56. The bent member 124 is provided so that its first end 126 is exposed to the outside by a predetermined length through a long groove 128 formed between the first casing 46 and the second casing 48.

An attachment screw hole 132 for installing a block-shaped holding member 130 is formed at the first end 126 of the bent member 124 protruding from the long groove 128 to the outside. The holding member 130 is detachably installed to the bent member 124 by the aid of a screw member 134 which is screwed into the attachment screw hole 132 through a penetrating screw hole 133. The knuckle block 56, the bent member 124, and the holding member 130 are provided to be linearly displaceable together with the piston rod 32 in an integrated manner respectively.

Figure 10:
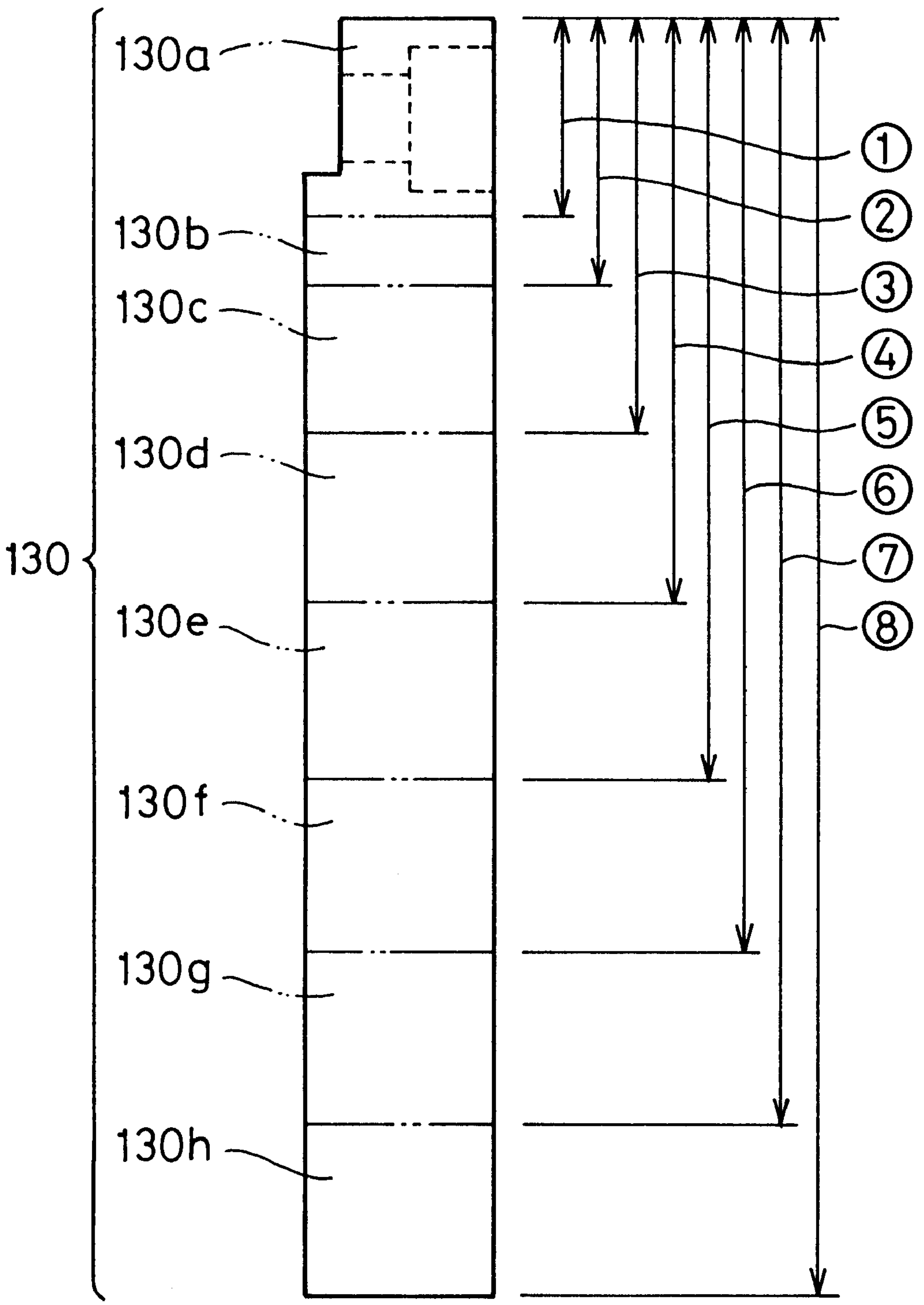
FIG. 10 shows a side view illustrating a plurality of holding members to be connected to the first end of the bent member.

As shown in FIG. 10, the holding member 130 includes a plurality of holding members (detection objects) 130*a* to 130*h* which are made of a metal material and which have different lengths (1) to (8) respectively. The holding member 130 is selectively provided corresponding to the amount of rotation of the arm 20. The holding member 130 can be conveniently exchanged with another holding member 130*a* to 130*h* by detaching the switch holder 114 from the body 12 and loosening the screw member 112.

Figure 9:
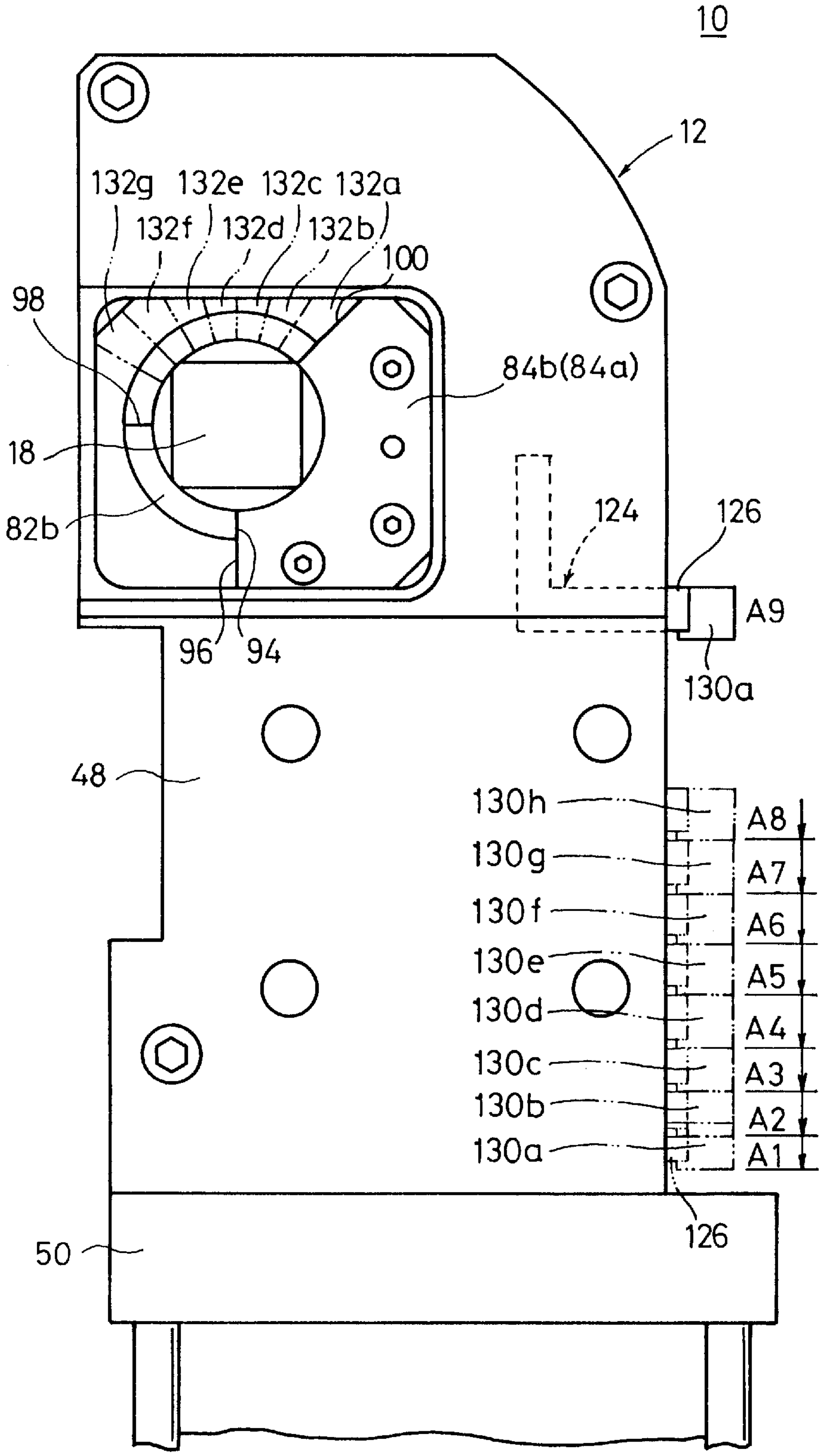
FIG. 9 shows a side view illustrating the shapes of a plurality of plates for regulating the rotary action of an arm, and illustrating an initial position and a terminal end position of a first end of a bent member which is displaceable linearly in accordance with the rotary action of the arm.

That is, the amount of rotation of the arm 20 is set by the pair of plates 84*a,* 84*b* which function as the stopper. As shown in FIG. 9, the arm 20 can be set to have a desired amount of rotation by exchanging the plate 84*a,* 84*b* with one of other plates 132*a* to 132*g* which are formed as separate members and which have different angles of the second abutment surface 100 respectively.

For example, when the plate 84*a* (84*b*) shown in FIG. 4 is used, the amount of rotation of the arm 20 is maximum. The holding member 130*a* having the shortest length (1) is installed to the first end 126 of the bent member 124 fixed to the knuckle block 56. The holding member 130*a* is linearly displaceable along the long hole 128 from the initial position A1 to give the unclamping state to the terminal end position of displacement A9 to give the clamping state (see FIG. 9). In this case, the holding member 130*a* composed of the metal detection object is sensed by the pair of proximity switches 118*a,* 118*b* respectively when it arrives at the initial position A1 or the terminal end position of displacement A9.

On the other hand, as shown in FIG. 9, when the plate 84*a* (84*b*) is exchanged with another plate 132*g* which is the member separate from the plate 84*a* (84*b*) and which is formed such that the second abutment surface 100 is formed to have the different angle in the counterclockwise direction, the amount of rotation of the arm 20 is minimum. The first end 126 of the bent member 124 fixed to the knuckle block 56 is linearly displaceably along the long groove 128 from the initial position A8 to give the unclamping state to the terminal end position of displacement A9 to give the clamping state. In this case, the first end 126 of the bent member 124 is separated from the first proximity switch 118*a* at the initial position A8. Therefore, the holding member 130*h* composed of the metal detection object is connected to the first end 126 of the bent member 124 to detect the holding member 130*h* by means of the proximity switch 118*a*. In other words, when the another plate 132*g* is used, the position can be detected by the proximity switch 118*a* by connecting, to the first end 126, the holding member 130*h* having the length (8) corresponding to the spacing distance between the first end 126 of the bent member 124 and the first proximity switch 118*a*.

Similarly, with reference to FIG. 9, when another plate 132*a* to 132*f,* in which the second abutment surface 100 is formed to have the mutually different angle in the counterclockwise direction, the first end 126 of the bent member 124 is displaceable from each of the initial positions A2 to A7 to the terminal end position of displacement A9. Another holding member 130*b* to 130*g,* which has the mutually different length (2) to (7), is connected corresponding to the another plate 132*a* to 132*f.*

The corresponding relationship between the plates 84*a* (84*b*), 132*a* to 132*g* and the holding members 130*a* to 130*h* is clarified as follows. That is, the plate 84*a* (84*b*) corresponds to the holding member 130*a,* the plate 132*a* corresponds to the holding member 130*b,* the plate 132*b* corresponds to the holding member 130*c,* the plate 132*c* corresponds to the holding member 130*d,* the plate 132*d* corresponds to the holding member 130*e,* the plate 132*e* corresponds to the holding member 130*f,* the plate 132*f* corresponds to the holding member 130*g,* and the plate 132*g* corresponds to the holding member 130*h.*

The initial position (A1 to A8) of the first end 126 of the bent member 124 is changed depending on the plate 84*a,* 84*b,* 132*a* to 132*g* for setting the amount of rotation of the arm 20, in accordance with which the displacement amount of the first end 126 of the bent member 124 is changed. However, the terminal end position of displacement A9, at which the clamping state is given, is constant in each of the cases.

As described above, even when the desired plate is selected from the plurality of plates 84*a,* 84*b,* 132*a* to 132*g* to set the predetermined amount of the amount of rotation of the arm 20, the position of rotation of the arm 20 can be detected stably and reliably by selecting the holding member corresponding to the desired plate from the plurality of holding members 130*a* to 130*h* and installing the selected holding member to the first end 126 of the bent member 124.

The clamp apparatus 10 according to the embodiment of the present invention is basically constructed as described above. Next, its operation, function, and effect will be explained.

Figure 11:
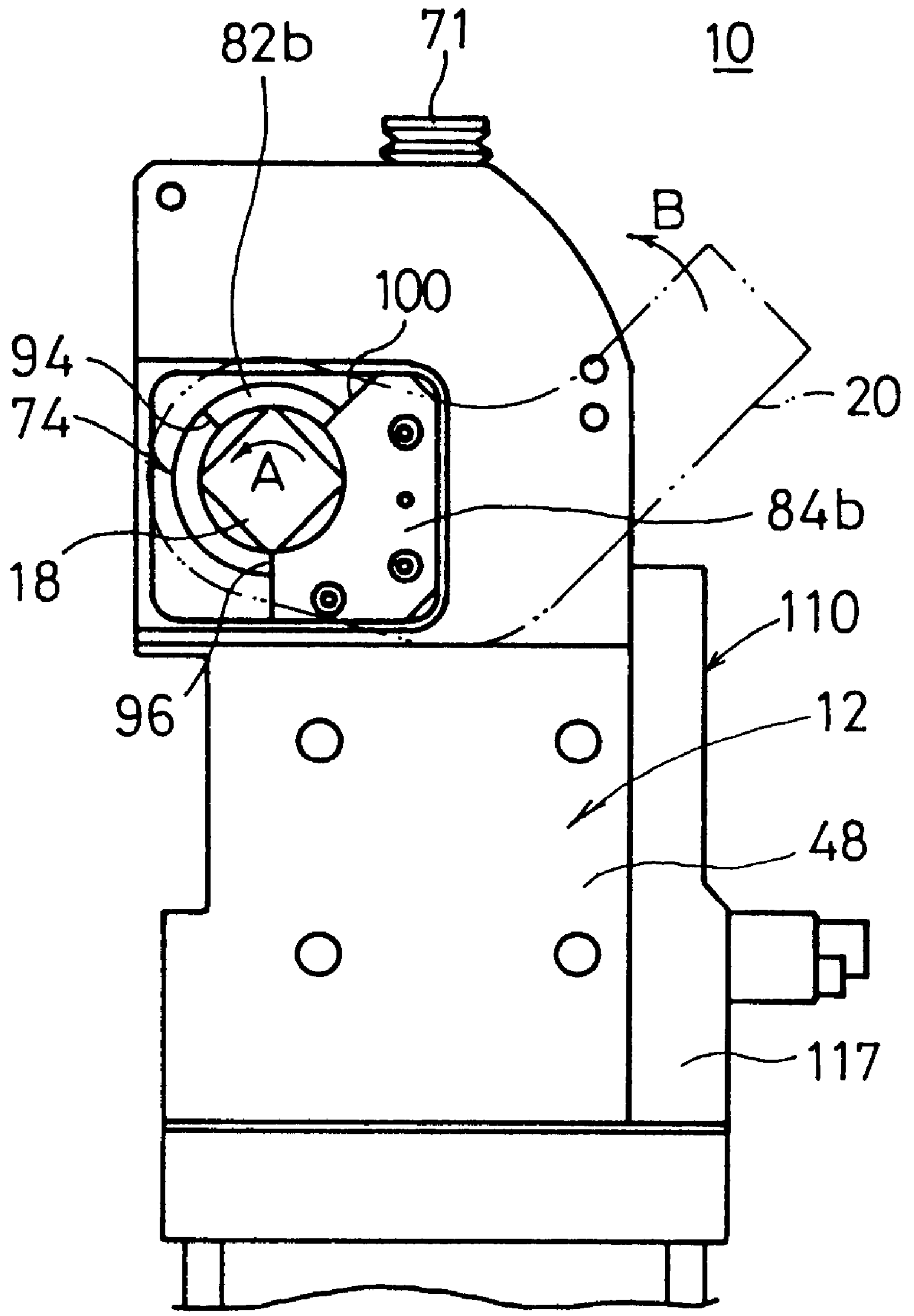
FIG. 11 illustrates the operation effected when the arm is at the initial position.
Figure 12:
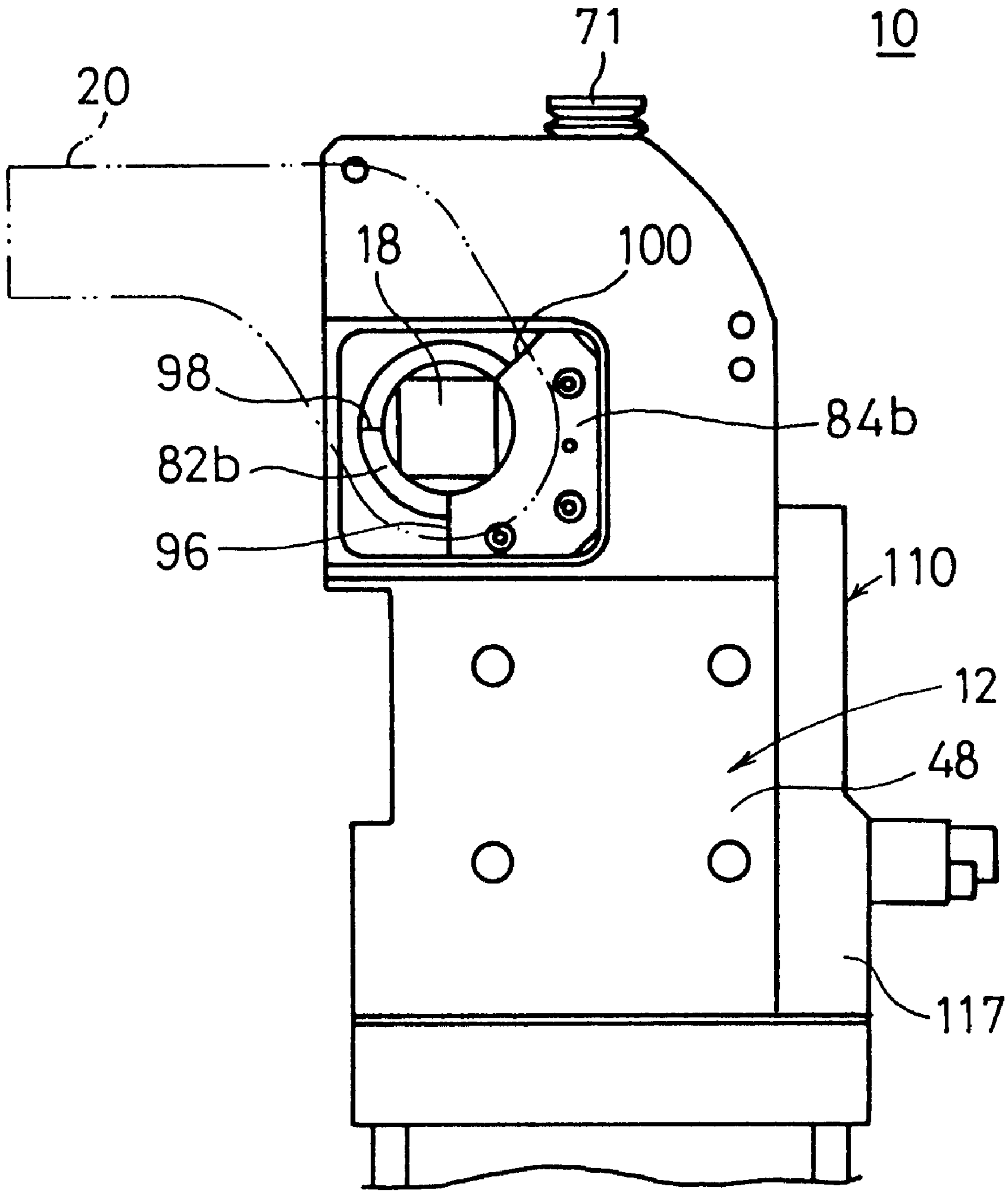
FIG. 12 shows the operation effected when the rotary action of the arm is stopped to give a clamping state.

At first, the clamp apparatus 10 is fixed to a predetermined position by the aid of an unillustrated fixing means. First ends of pipes such as unillustrated tubes are connected to the pair of pressure fluid inlet/outlet ports 42*a,* 44*a* (or 42*b,* 44*b*) respectively. Second ends of the pipes are connected to an unillustrated pressure fluid supply source. FIG. 11 shows the clamp apparatus 10 in the unclamping state, and FIG. 12 shows the clamp apparatus 10 in the clamping state. The following description will be made assuming that the unclamping state shown in FIG. 11 resides in the initial position.

After performing the preparatory operation as described above, the unillustrated pressure fluid supply source is energized at the initial position shown in FIG. 11 to introduce the pressure fluid from the first pressure fluid inlet/outlet port 44*a* into the cylinder chamber 28. The piston 30 is pressed in accordance with the action of the pressure fluid introduced into the cylinder chamber 28. The piston 30 is moved upwardly along the cylinder chamber 28. During this process, the guiding action is effected by the wear ring 34 which is installed to the outer circumferential surface of the piston 30 and the guide groove 58 on which the knuckle block 56 makes the sliding displacement. Accordingly, the linear accuracy is maintained for the piston 30, the piston rod 32, and the knuckle block 56.

The rectilinear motion of the piston 30 is transmitted to the toggle link mechanism 64 via the piston rod 32 and the knuckle joint 62, and it is converted into the rotary motion of the arm 20 in accordance with the rotary action of the support lever 74 which constitutes the toggle link mechanism 64.

That is, the rectilinear motion (upward movement) of the piston 30 allows the force to act so that the link plate 72 and the knuckle joint 62 engaged with the free end of the piston rod 32 are pressed in the upward direction. Owing to the pressing force exerted on the link plate 72, the link plate 72 is rotated by a predetermined angle about the support point of the knuckle pin 70, and the support lever 74 is rotated in accordance with the linking action of the link plate 72 in the direction of the arrow A.

Therefore, the arm 20 is rotated by a predetermined angle in the direction of the arrow B about the support point of the bearing section 18 of the support lever 74. Accordingly, the circular arc-shaped projection 82*b* (82*a*) is rotated by the predetermined angle integrally with the support lever 74.

Figure 13:
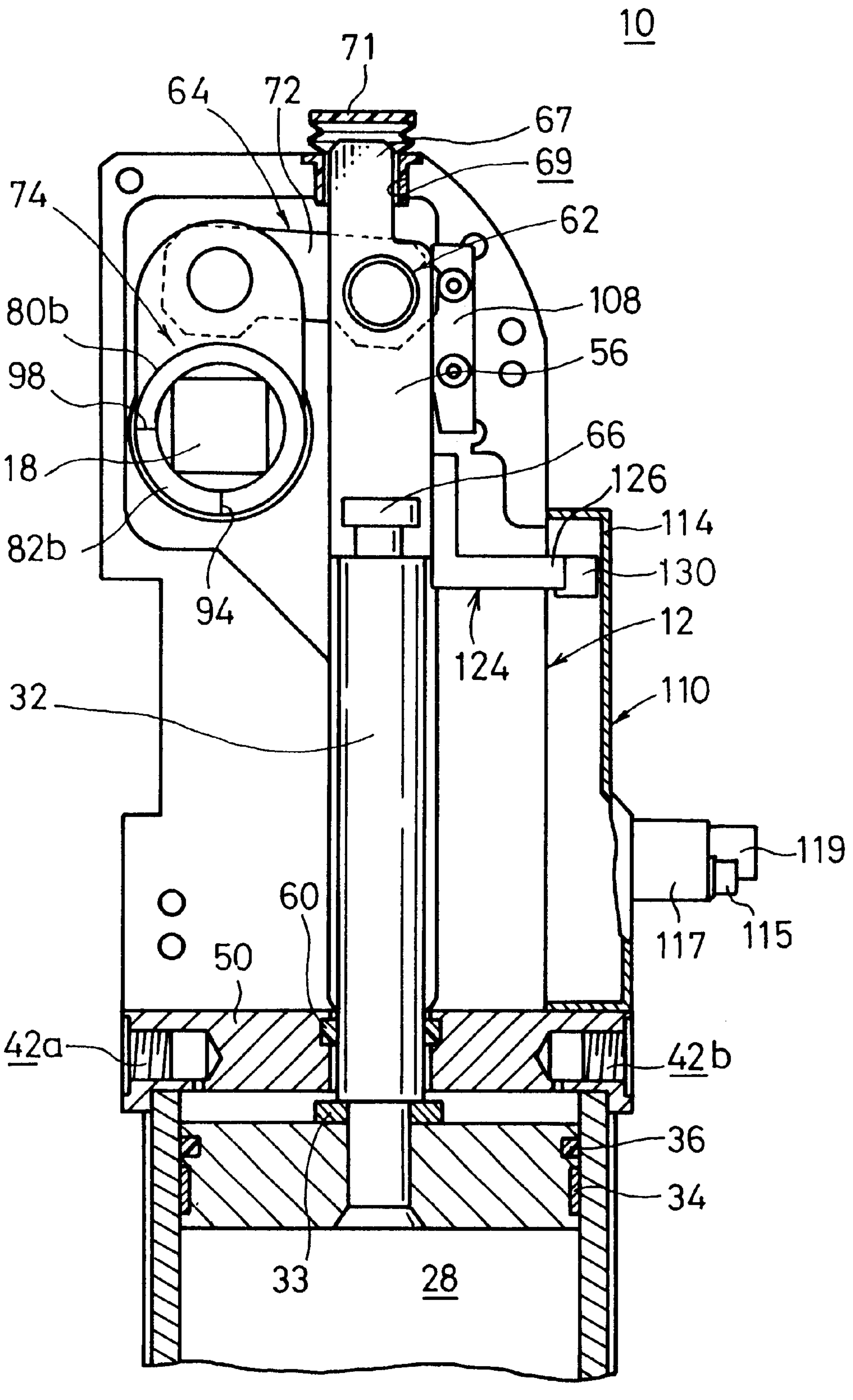
FIG. 13 shows a partial vertical sectional view illustrating the position of a spacer when the clamping state is given.

During the process in which the arm 20 is rotated in the direction of the arrow B as described above, the first end surface 94 of the circular arc-shaped projection 82*b* (82*a*) abuts against the first abutment surface 96 of the plate 84*b* (84*a*) which is fixed to the body 12. Accordingly, the arm 20 stops the rotary action. As a result, the clamping state is given, in which the workpiece is clamped by the arm 20 (see FIG. 12). In the clamping state described above, as shown in FIG. 13, the spacer 33, which is provided at the connecting portion between the piston 30 and the piston rod 32, does not abut against the wall surface of the projection 50 which forms the cylinder chamber 28. The reaction force, which is exerted when the unillustrated workpiece is clamped, is received by the reaction force-receiving plate 108 against which the link plate 72 abuts.

After the arm 20 stops the rotary action to give the clamping state, the piston 30 and the piston rod 32 are further moved slightly upwardly. The spacer 33 abuts against the wall surface of the projection 50. Accordingly, the piston 30 and the piston rod 32 are stopped to give the terminal end position of the displacement (see FIG. 3). In this arrangement, the releasing projection 67, which is formed integrally with the knuckle block 56, protrudes by the predetermined length from the elliptic opening 69 formed at the upper portion of the body 12, and it is disposed in the hole in the cap 71. Therefore, when the operator presses the releasing projection 67 via the flexible cap 71 to displace the releasing projection 67 downwardly, the clamping state can be canceled to make restoration to the unclamping state.

On the other hand, when the pressure fluid is supplied to the pressure fluid inlet/outlet port 42*a* in accordance with the switching action of an unillustrated changeover valve in the state shown in FIG. 12, the piston 30 is moved downwardly. Further, the support lever 74 is rotated in a direction opposite to the direction described above by the aid of the link plate 72 in accordance with the downward movement action of the piston rod 32. Accordingly, the arm 20 is rotated in a direction to make separation from the workpiece.

During the process in which the arm 20 is rotated in the direction to make separation from the workpiece, the second end surface 98 of the circular arc-shaped projection 82*b* (82*a*) abuts against the second abutment surface 100 of the plate 84*b* (84*a*) which is fixed to the body 12. Accordingly, the arm 20 stops the rotary action. As a result, the clamp apparatus 10 is restored to the initial position shown in FIG. 11.

The pair of proximity switches 118*a*, 118*b*, which are provided for the detecting section 110, sense the holding member 130*a* composed of the metal detection object which is displaced integrally with the knuckle block 56. Accordingly, it is detected that the arm 20 arrives at the initial position in the unclamping state and that the arm 20 performs the rotary action by the predetermined angle to give the clamping state.

That is, when the pair of cover members 88*a*, 88*b* are detached respectively to replace the plate 84*a* (84*b*) with one of the other plates 132*a* to 132*g*, it is necessary that the switch holder 114 is removed to connect one of the holding members 130*b* to 130*h* each having the length (2) to (8) corresponding to the selected other plate 132*a* to 132*g*, to the first end 126 of the bent member 124. The holding member 130*b* to 130*h* connected as described above is sensed by the pair of proximity switches 118*a*, 118*b*. Accordingly, it is detected that the arm 20 is in any one of the positions corresponding to the clamping state and the unclamping state.

In the clamp apparatus 10 according to the embodiment of the present invention, the circular arc-shaped projections 82*a*, 82*b*, which function as the stopper, are exposed to the outside of the body 12 through the substantially circular openings 16*a*, 16*b* formed through the body 12. In other words, the stopper for stopping the rotary action of the arm 20 is provided at the outside of the body 12.

Therefore, as shown in FIG. 4, when the second casing 48 is detached from the first casing 46 for constructing the body 12, it is possible to conveniently exchange the support lever 74 on which the circular arc-shaped projection 82*a*, 82*b* to function as the stopper is provided.

In the clamp apparatus 10 described above, the plate 84*a*, 84*b*, which abuts against the circular arc-shaped projection 82*a*, 82*b*, is detachably installed to the first casing 46 and the second casing 48 by the aid of the screw member 92 respectively. Therefore, the cover members 88*a*, 88*b*, which are installed to the body 12, are detached without disassembling the first casing 46 and the second casing 48 which constitute the body 12 to make exchange with the other plates 132*a* to 132*g* having different angles of the first abutment surface 96 and the second abutment surface 100 to make abutment against the circular arc-shaped projections 82*a*, 82*b*. Accordingly, the range of the rotary action of the arm 20 can be conveniently changed, and the amount of rotation of the arm 20 can be conveniently set. Thus, it is possible to perform the maintenance operation conveniently and efficiently as described above.

When the range of the rotary action of the arm 20 is changed, the holding member 130*a* to 130*h*, which has the length (1) to (8) corresponding to the selected plate 132*a* to 132*g*, is connected to the first end 126 of the bent member 124. Accordingly, it is possible to reliably detect the position of rotation of the arm 20.

The spacer 33, which regulates the terminal end position of the displacement of the piston 30, is provided at the connecting portion between the piston 30 and the piston rod 32 in the cylinder section 14. Accordingly, it is possible to reliably avoid any invasion into the top dead center (dead point), by using the simple structure.

In this case, as shown in FIG. 3, when the piston 30 abuts against the spacer 33 to arrive at the terminal end position of the displacement, then the releasing projection 67, which is formed integrally with the knuckle block 56, protrudes by the predetermined length from the opening 69, and it is disposed in the hole in the cap 71. Therefore, as shown in FIG. 14, the knuckle block 56 does not abut against the inner wall surfaces of the first and second casings 46, 48, and its displacement is not restricted. Accordingly, the following advantage is obtained. That is, the compressive load is mitigated for the piston rod 32 to an extent corresponding to an amount of the compressive load received by the spacer 33. The diameter of the piston rod 32 can be formed to be a reduced diameter, making it possible to realize a light weight.

The embodiment of the present invention has been explained by using the cylinder section 14 as the driving source. However, there is no limitation thereto. It is a matter of course that a rotary driving source including, for example, an unillustrated electric motor or a linear actuator or the like may be used.

What is claimed is:

1. A clamp apparatus for clamping a workpiece with a rotatable arm, said clamp apparatus comprising:

- a body;
- a driving source integrally connected to said body;
- a driving force-transmitting mechanism for transmitting driving force of said driving source;
- a toggle link mechanism for converting said driving force transmitted from said driving force-transmitting mechanism into rotary motion of said arm;
- a rotation amount-setting mechanism for setting a rotation amount of said arm; and
- a detecting mechanism provided exchangeably corresponding to said rotation amount of said arm set by said rotation amount-setting mechanism, for detecting a first terminal end position of displacement at which said arm is in an unclamping state and a second terminal end position of displacement at which said arm is in a clamping state.

2. The clamp apparatus according to claim 1, wherein said rotation amount-setting mechanism includes a pair of circular arc-shaped projections which are formed on a support lever that is rotatable integrally with said arm, and plates which are detachably installed to said body and each of which is formed with a first abutment surface and a second abutment surface to make abutment against said pair of circular arc-shaped projections respectively, and said plate includes a plurality of plates having different angles of separation between said first abutment surface and said second abutment surface respectively.

3. The clamp apparatus according to claim 1, wherein said detecting mechanism includes a detection object which is displaceable in an axial direction of said body in accordance with rotary action of said arm, and a first sensor and a second sensor for sensing a position of said detection object, and said detection object is selected from a plurality of available detection objects having respective different lengths and selectively provided corresponding to said rotation amount of said arm.

4. The clamp apparatus according to claim 3, wherein said detection object is composed of a metal detection object, and said first sensor and said second sensor are composed of a pair of proximity switches for sensing change of impedance in accordance with approaching action of said metal detection object respectively.

5. The clamp apparatus according to claim 1, wherein said detecting mechanism includes a switch holder which is detachably installed to a side surface portion of said body by the aid of a screw member.

6. The clamp apparatus according to claim 1, wherein said driving force-transmitting mechanism has a knuckle block, said knuckle block is provided with a releasing projection which protrudes by a predetermined length from an opening formed through said body when said workpiece is clamped by said arm, and said clamping state is canceled by manual operation by pressing and displacing said releasing projection.

7. The clamp apparatus according to claim 6, wherein said releasing projection is formed integrally with said knuckle block.

8. The clamp apparatus according to claim 1, wherein said driving source is composed of a cylinder section having a piston which makes reciprocating movement along a cylinder chamber accommodated in a cylinder tube, and a piston rod which is connected to said piston to make displacement integrally with said piston, and a spacer for regulating displacement of said piston is provided at a connecting portion between said piston and said piston rod.

* * * * *